United States Patent [19]

Taniguchi et al.

[11] 4,035,605
[45] July 12, 1977

[54] NARROW GROOVE WELDING METHOD, AND WELDING APPARATUS FOR PRACTICING THE METHOD

[75] Inventors: Yasuo Taniguchi; Shinichi Konishi, both of Kawagoe, Japan

[73] Assignee: Denyo Kabushiki Kaisha, Japan

[21] Appl. No.: 605,823

[22] Filed: Aug. 19, 1975

[30] Foreign Application Priority Data

Mar. 19, 1975 Japan .............................. 50-33298
Mar. 27, 1975 Japan ...................... 50-41057[U]

[51] Int. Cl.² .................................. B23K 9/00
[52] U.S. Cl. ........................... 219/126; 219/121 P
[58] Field of Search ........... 219/121 P, 126, 125 R, 219/73 A, 73 R

[56] References Cited

U.S. PATENT DOCUMENTS

| | | | |
|---|---|---|---|
| 3,328,556 | 6/1967 | Nelson et al. | 219/125 R |
| 3,806,695 | 4/1974 | Carroll et al. | 219/126 |
| 3,839,619 | 10/1974 | Normando et al. | 219/126 |
| 3,891,824 | 6/1975 | Essers et al. | 219/121 P |

Primary Examiner—J. V. Truhe
Assistant Examiner—Clifford C. Shaw

[57] ABSTRACT

The front and rear surfaces of plates to be butt-welded are slidably held by front and rear backing shoes, respectively, for defining a welding space in a narrow groove formed by the edges of the plates, and the edges are melted by a plasma arc generating torch, while a plurality of consumable electrodes are fed into the welding space are molten by arcs generated therebetween. The backing shoes, the torch, and the consumable electrodes are moved along the groove to obtain a butt-weld of high quality at high efficiency. In addition, the electrode of the torch has an elongated configuration in section at its end portion, and its restraining nozzle surrounding the electrode has a nozzle opening which also has an elongated configuration in correspondence to the end portion of the electrode. The longitudinal axes of these configurations are aligned with each other to effectively utilize the energy of a plasma arc generated by the torch.

10 Claims, 18 Drawing Figures

NARROW GROOVE WELDING METHOD, AND WELDING APPARATUS FOR PRACTICING THE METHOD

BACKGROUND OF THE INVENTION

This invention relates to a method of butt-welding metal plates having a relatively narrow groove therebetween, and a welding apparatus for practicing the method, and to an improvement of a plasma arc generating torch employed in the apparatus.

For butt-welding steel plates of a large structure on a spot by a vertical or horizontal welding method, electro-slag welding and an electro-gas welding are popularly employed. The latter have various merits; for instance, the working of a welding groove can be readily achieved, and deformation due to welding is substantially absent. However, welding of to the base metal and therefore the portions of the welded plates affected by the heat are reduced, that is, the mechanical properties of such portions deteriorate.

More specifically, in the conventional electro-slag welding process or the conventional electro-gas welding process, the welding is conducted by maintaining the melting of the metal plates or the work, and the melting or a welding wire by feeding electric current between the welding wire and the work; therefore a groove provided between the metal plates should have a relatively large width and the welding wire also should have a relatively large diameter so that the melting rate (that is, the welding rate) of the welding wire is not greater than the melting rate of the plates; that is, the welding must be conducted at a low rate so that the metal plates are sufficiently molten.

The fact that the welding groove has a large width is convenient for inserting the welding wire thereinto, but is undesirable for the following reasons: the large width of the groove makes the welding rate slow, which leads to the application of excessive heat to the work. As a result, metal is excessively molten from the work, and the metallurgical properties of the weld of the work deteriorate. Thus, the conventional electro-slag or electro-gas welding method cannot be employed for welding materials such as thick plates, high-tension steel plates, or alloy steel plates which are greatly affected by heat. Especially in the electro-slag welding process, which is a kind of resistance welding process utilizing molten slag, the weld penetration of metal plates is insufficient at the start of the welding, and lack of fusion is produced, so that the work must be subjected to rewelding, or repaired by another welding method.

In order to overcome the above-described difficulties, recently a narrow gap welding method, i.e., one of several metal shield gas welding methods has been proposed. In this method, a narrow welding groove and a small welding current are employed to reduce heat applied to metal plates to be welded. As a result, the metallurgical properties of the work are improved. However, in this method, it is necessary to oscillate a welding arc by an oscillating mechanism and also to conduct multiple-layer welding. Furthermore, it is impossible to increase the welding rate because of the employment of a small welding current. This is, a specific feature of the narrow gap welding method, i.e., the reduction of heat applied to the work results in the lowering of its welding efficiency, and therefore the application of the narrow gap welding method is limited.

In order to overcome the above-described difficulties accompanying these conventional welding methods, applicant has proposed a vertical position welding method and a welding apparatus for practicing the method. However, this method is limited to the butt-welding of plates in a vertical position, and a welding wire is molten by an arc produced between the welding wire and a nonconsumable electrode torch, that is, a plasma arc generating torch, thus damaging the latter.

Thus, it is necessary to provide a novel welding method and a welding apparatus for practicing the method by which a weld high in quality can be achieved with high efficiency.

This requirement has led to the need to improve a plasma arc generating torch employed in the novel welding method due to the following reasons:

The specific features of a plasma arc generating torch are to compress the arc by a Lorentz's force which is directed radially to the center of a section of the arc by the action of a magnetic field generated by the arc current, and to improve the concentration factor of energy of the arc by restraining the arc column by the use of a thermal pinch effect which is obtained by cooling the outside surface of the arc column with a shielding gas and a plasma gas.

Accordingly, the electrode of an ordinary plasma arc generating torch is a cylindrical rod whose end portion is sharpened, so as to effect the energy concentration of the arc and also the stability of the same. However, in practice, the arc generated from the tip end of the sharpened electrode diverges greatly after it has passed its restraining nozzle, while a welding current allowable per welding electrode is limited. Accordingly, in order to increase the welding current or to apply a large welding current to the work, it is necessary to use a plasma arc generating torch having a plurality of electrodes or a large current capacity.

In addition to the fundamental plasma arc method described above, a magnetic control method and a gas discharge direction regulating method are known in the art for increasing the concentration of the energy of an arc. In the magnetic control method, a magnetic field is applied externally to an arc which has passed through an opening in its nozzle to obtain a flat arc column and thereby to increase the current density and the potential gradient of the arc. In the gas discharge direction regulating method, the nozzle has an elliptical or rectangular opening to control the discharge rate and direction of the gas so as to flatten the arc, as a result of which the same above-described effect is obtained.

In either of these two methods, the cylindrical arc produced by the sharpened electrode is restrained or deformed into a flat arc. Therefore, in the arc generated by the sharpened electrode, the current density is higher at the central portion of the arc column, that is, it is difficult to disperse the current in the direction of the major axis of the ellipse. In addition, in order to deform the arc only by means of the opening in the nozzle, it is necessary to feed a large quantity of controlled gas flow, which is liable to damage the nozzle.

SUMMARY OF THE INVENTION

Accordingly, a general object of this invention is to provide a narrow groove welding method for butt-welding metal plates, and a welding apparatus for practicing the method in which all of the difficulties accompanying conventional butt-welding methods can be overcome.

More specifically, a general object of the invention is to provide a narrow groove welding method for butt-welding metal plates in a vertical or horizontal position, and a welding apparatus for practicing the method by which a vertical or horizontal butt weld of high quality can be accomplished at high efficiency by preventing the occurrence of a lack of fusion at the start of the welding, by uniformly heating the edges of the metal plates to be butt-welded, by reducing the width of a welding groove formed by the edges, and by minimizing the quantity of heat applied to the metal plates to be butt-welded.

Another object of the invention is to provide a plasma arc generating torch employed in a narrow groove welding apparatus for butt-welding metal plates, which torch can readily produce a flat plasma arc suitable for increasing the energy concentration of the plasma arc without the reduction of the service life of its nozzle section.

A further object of the invention is to provide a plasma arc generating torch in which a flow rate of a plasma gas is relatively small wherein, a nozzle section thereof is protected from damage, and where its construction is simple, and which is suitable for welding or cutting metal plates.

The foregoing objects and other objects have been achieved by the provision of a novel narrow groove welding method for butt-welding metal plates in a vertical or horizontal position, and a welding apparatus for practicing the method, and also by the provision of an improved plasma arc generating torch according to this invention, as briefly stated below i.e., in this invention, a narrow welding groove is formed by the edges of metal plates to be butt-welded, the front and rear surfaces of the metal plates, or the work, are slidably held by front and rear holding members, or front and rear backing shoes, of the water-cooling type, respectively, for defining a welding space in the groove, and the edges of the plates in the welding space are melted by a plasma arc generated by a non-consumable electrode torch, or a plasma arc generating torch, while a plurality of consumable electrodes, or welding wires, are fed into the welding space and are molten by arcs produced therebetween. The holding members, the torch, and the welding wires are all moved along the narrow groove so that a butt-weld of a high quality at high efficiency is obtained. Furthermore, according to another aspect of this invention, in the plasma arc generating torch, the end portion of its electrode has a relatively elongated configuration in section, while an opening provided in its restraining nozzle is also made to have a relatively elongated configuration in correspondence to the end portion of the electrode, and the electrode and the restraining nozzle are so arranged that the longitudinal axes of these elongated configurations are aligned with each other to effectively utilize the energy of the plasma arc generated by the torch.

The nature, principle and utility of this invention will become more apparent from the following detailed description and the appended claims when read in conjunction with the accompanying drawings.

DETAILED DESCRIPTION OF THE INVENTION

Figure 1:
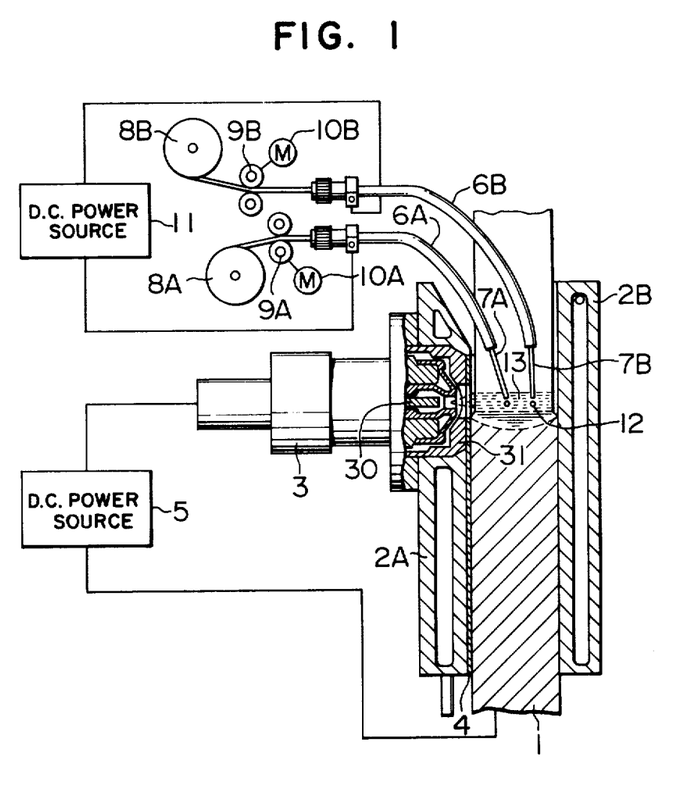
FIG. 1 is an elevational view (partly a sectional view and a block diagram) illustrating a first example of a welding apparatus for butt-welding plates, according to this invention.

In one embodiment of the present invention, as shown in FIG. 1, two base metals or two steel plates 1 (referred to as the work when applicable) to be butt-welded by a vertical position welding method, according to the invention are arranged in one plane to form a vertical "I"-shaped welding groove therebetween. Two water-cooled type front and rear holding members, or front and rear backing shoes 2A and 2B are placed on the front surface and the rear surface of the work 1, so as to form a welding space in the groove. The holding members 2A and 2B are made of metal, such as copper, which has a good thermal conductivity. The holding members 2A and 2B can vertically slide along the groove, so as to move the welding space vertically.

The holding member 2A placed on the front surface of the work 1 has a through-hole into which the end portion of a non-consumable electrode torch 3 is fixedly inserted in such a manner that the nozzle of the torch 3 is directed to the groove. The torch 3 employed in this embodiment is a plasma arc-generating torch.

An electrically insulating plate 4 is provided on the front holding member 2A so as to cover the molten metal and the bead produced on the front side of the work, and also to insulate the end portion of the torch 3 from the work 1. The plate 4 is refractory and has a good thermal conductivity. The work 1 and the torch 3 are connected to the positive and negative terminals of a welding d.c. source 5, respectively, so that the torch 3 generates a plasma arc for melting the edges of the metal plated to be welded.

Two wire guide tubes 6A and 6B are inserted in the groove from above, so as to feed welding wires, that is, consumable electrodes 7A and 7B into the welding space. If necessary, one of the wire guide tubes 6A and 6B may be inserted into the groove from above the rear holding member 2B. The consumable electrodes 7A and 7B are fed respectively through the wire guide tubes 6A and 6B by wire feeding mechanisms which comprise wire reels 8A and 8B, wire feeding rollers 9A and 9B, and wire feeding motors 10A and 10B, respectively. The consumable electrodes 7A and 7B are connected to a welding a.c. source or a welding d.c. source 11. The ends of the consumable electrodes 7A and 7B are extended to the vicinity of the plasma arc to generate an arc, but are suitably spaced apart from each other, that is, the consumable electrodes are spaced from one another by the shortest possible distance between the ends thereof, so that the arc is generated only between the ends of the electrodes.

Figure 2:
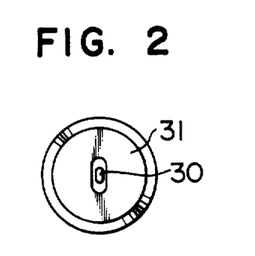
FIG. 2 is a front view illustrating a non-consumable electrode torch employed in the welding apparatus shown in FIG. 1.

Both a nozzle opening in the nozzle 31 of the nonconsumable electrode torch 3 fixed to the front holding member 2A, and the section of a tungsten electrode of the torch 3 are elliptical, as shown in FIG. 2, or rectangular. In the welding operation, the longitudinal axes of these elliptical or rectangular configurations are aligned with a weld line, that is, the direction of the welding groove, so that an effective input current of the torch is substantially increased and so that the application of excessive heat to the work and the excessive melting of the work are prevented.

The wire guide tubes 6A and 6B, the non-consumable electrode torch 3, and the holding members 2A and 2B all are moved by a suitable means not shown vertically, that is, along the groove. In FIG. 1, reference numeral 12 is designated to indicate particle transfer from the consumable electrodes.

The narrow-groove welding method with the welding apparatus thus organized, according to the invention, will now be described.

A plasma arc is generated between the torch 3 and the work 1 by the torch 3, so that a plasma arc flame 13 is introduced into the welding space in the groove, that is, a linear heat source 13 melts both faces of the groove in the direction of the thickness of the work, while moving upward. In this operation, the consumable electrodes 7A and 7B are continuously fed into the welding space through the respective wire guide tubes 6A and 6B, and are molten by an arc generated between the ends of the consumable electrodes 7A and 7B. Molten weld metal of the electrodes is deposited in the welding space defined by the edges of the work and the holding members 2A and 2B. With the advancement of the deposition of the molten metal, the welding space is moved upward, that is, the consumable electrodes 7A and 7B are moved upward together with the non-consumable electrode torch 3, thus achieving vertical position welding.

The consumable electrodes 7A and 7B are fed in such a manner that the ends thereof appear in the plasma arc flame 13. However, these electrodes 7A and 7B are not molten directly by the heat of the plasma arc flame 13, but are molten by an arc generated therebetween through an electrically conductive material that is, an electrical conductive plasma arc flame 13 in ionized condition. In other words, the electrodes 7A and 7B are molten by an arc generated between the ends thereof, and the melting rate is increased by the heat of the plasma arc, and therefore the lengths of the electrode end portions appearing in the plasma arc flame 13 are very short.

The molten metal of the consumable electrodes 7A and 7B forms a molten metal pool in the welding space, which forms a bead in its bottom with the holding members 2A and 2B moving upward.

The consumable electrodes 7A and 7B are employed only for producing the molten metal 12, and this object can be achieved merely by extending the electrodes into the welding space in the groove, that is, the positions of the electrodes in the welding space are not critical.

The upward moving rate of the welding apparatus is determined by the condition that the non-consumable electrode torch 3 can satisfactorily melt both faces of the groove in the welding space. On the other hand, the consumable-electrode feeding rate is determined independently of the base-metal melting condition so that a rate of producing the molten weld metal to be deposited in the welding space is suitable for the welding. In the case where a welding d.c. source is employed for melting the consumable electrodes 7A and 7B, these electrodes should be fed individually because their melting rates are different.

Figure 3:
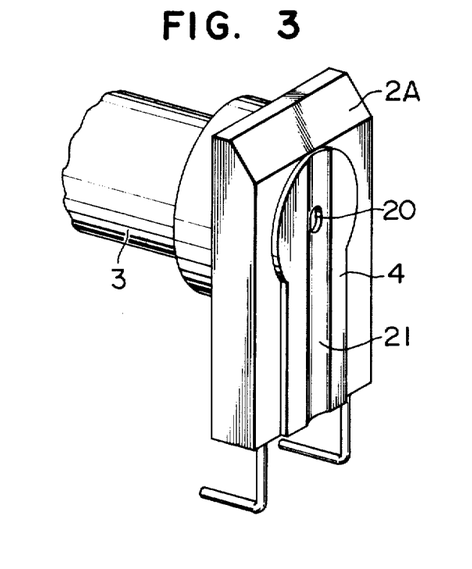
FIG. 3 is a perspective view illustrating a front holding member, or a front backing shoe, adapted to slidably hold the work.
Figure 4:
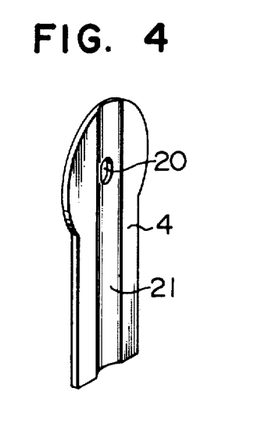
FIG. 4 is a perspective view showing an insulating plate in FIG. 3.

FIGS. 3 and 4 show the electrically insulating plate 4 provided on the front holding member 2A. This insulating plate is made of a heat-resisting insulating material such as ceramic. The insulating plate 4 has a through hole 20 whose position corresponds to the position of the nozzle of the non-consumable electrode torch 3, the diameter of the through hole 20 being substantially equal to that of the opening in the nozzle 31 (FIG. 1). The insulating plate 4 further has a straight groove in correspondence to the weld line for forming beads. The insulating plate 4 thus formed serves to electrically insulate the nozzles 31 and the front holding member 2A from the work 1, as has been described; however, in the case where the non-consumable electrode torch 3 is insulated from the holding member 3, the insulating plate 4 may be modified so as to insulate only the area surrounding the nozzle 31.

Figure 5:
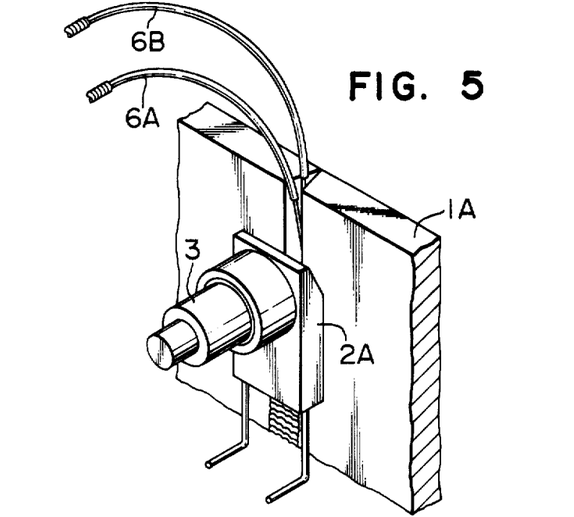
FIG. 5 is also a perspective view illustrating a welding condition in which a groove formed by metal plates is different from that shown in FIG. 1.

The vertical position welding method according to the invention, has been described in connection with the case where the edges of metal plates form an "I"-shape groove. However, the vertical position welding method can be applied also to the case where the edges of metal plates to be joined form a "V"-shaped narrow groove as shown in FIG. 5. In this case, this "V"-shaped narrow groove should be wide enough to allow the feeding of the consumable electrodes thereinto.

Figure 6A:
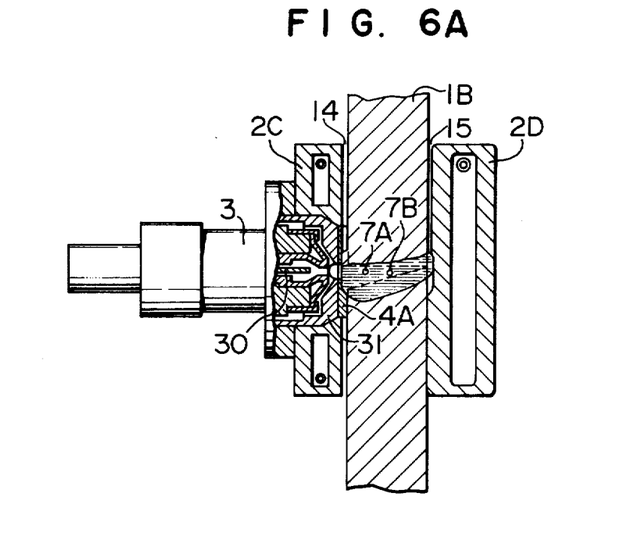
FIG. 6A is an elevational view (partly as a sectional view) illustrating a second example of this invention in which metal plates are butt-welded horizontally.
Figure 7:
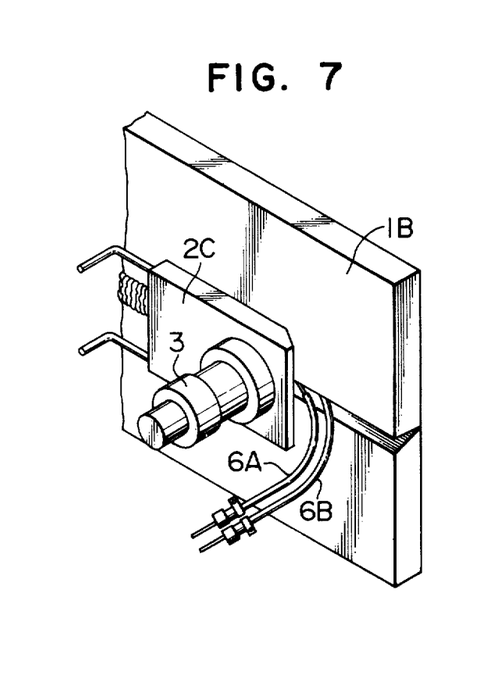
FIG. 7 is a perspective view showing the arrangement of consumable electrodes, a welding groove, and a non-consumable electrode torch with a front holding member, or a front backing plate, of the welding apparatus shown in FIG. 6.
Figure 8:
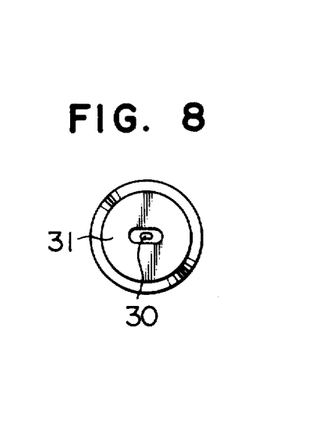
FIG. 8 is a front view illustrating the nozzle section of a non-consumable electrode torch employed in the welding apparatus shown in FIGS. 6A and 6B.

FIGS. 6A and 7 illustrate another embodiment of this invention, in which plates are butt-welded by a horizontal position welding method. In FIG. 6A, the weld line (or the groove) of the work 1B is perpendicular to the sheet of FIG. 6A, that is, the groove of the work is held horizontal. In this welding operation it is also necessary to align the longitudinal axis of the elliptical electrode 30 of the non-consumable electrode torch 3 and that of the mouth of the nozzle 31 with the horizontal weld line, as shown in FIG. 8.

Figure 9:
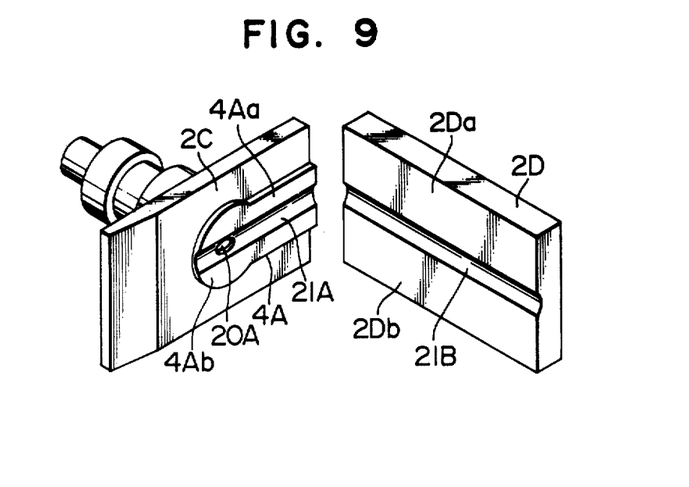
FIG. 9 is a perspective view illustrating front and rear holding members, or front and rear backing shoes employed in the welding apparatus shown in FIG. 6.

This horizontal position welding is different from the vertical position welding described above only in that the direction of the weld line is horizontal; the configurations of the front and rear holding members 2C and 2D are as shown in FIG. 9.

In the horizontal position welding method, it is required to let the gas introduced into the groove from the non-consumable electrode torch 3 flow out and to the atmosphere so as to prevent the occurrence defects, such as blowholes. For this purpose, the rear holding member 2D and the insulating plate 4A are placed on the work in such a manner that these plates do not closely surround the welding space; that is, as is shown in FIGS. 6A and 9, gaps 14 and 15 are provided between the upper portion of the front holding member 2C and the work 1B, and between the rear holding member 2D and the work 1B, so as to let the gas escape from welding space.

Similarly, as in the case of vertical position welding, the insulating plate 4A and the rear holding member have, along the weld line, grooves 21A and 21B for forming beads, respectively, and the insulating plate 4A has a through hole 20A at its portion which corresponds to the nozzle opening in the torch 3.

More specifically, the insulating plate 4A has a portion defining the bead forming groove 21A in correspondence with the welding groove, and two embossed side portions 4Aa and 4Ab are obtained by the formation of the bead forming groove 21, the side portion 4Aa being thinner than the side portion 4Ab; while the rear holding member 2D also has the bead forming groove 21B in correspondence with the welding groove, and two side portions 2Da and 2Db obtained by the formation of the bead forming groove 21B, the side portion 2Da being thinner than the side portion 2Db, so as to discharge the gas in the welding space upwards, as is apparent from FIGS. 6A and 9.

A plasma arc flame generated by the non-consumable electrode torch 3 is moved horizontally along the weld line or the welding groove, while melting the edges of the work, that is, the upper wall and the lower wall of the welding groove. The metal molten from the upper wall tends to drop out of the welding area by gravity, but is retained at a suitable level by the force of the arc and by the surface tension of the molten metal itself. As is shown in FIG. 7, the consumable electrodes are guided by the wire guide tubes 6A and 6B into the V-shaped welding groove, and generate a series arc in the atmosphere of the plasma arc to produce molten metal therefrom. The molten metal thus produced tends to flow beyond the arc in the direction of the weld line, but is detained at a suitable position by the force of the arc generated by the consumable electrodes, thus forming a bead. The bead formed at the upper portion of the groove on the front side of the way may be insufficient when compared with the thickness of the base metal 1B. This can be remedied by forming an additional welding layer on that portion referred to by, for instance, carbon dioxide gas welding.

In the horizontal position welding method described above, the welding wires horizontally inserted into the groove come into contact with the plasma arc flame, and therefore particles thereof are scattered by the plasma arc flame, that is, it is rather difficult to transfer the particles into the molten metal pooled behind the plasma arc flame.

Figure 6B:
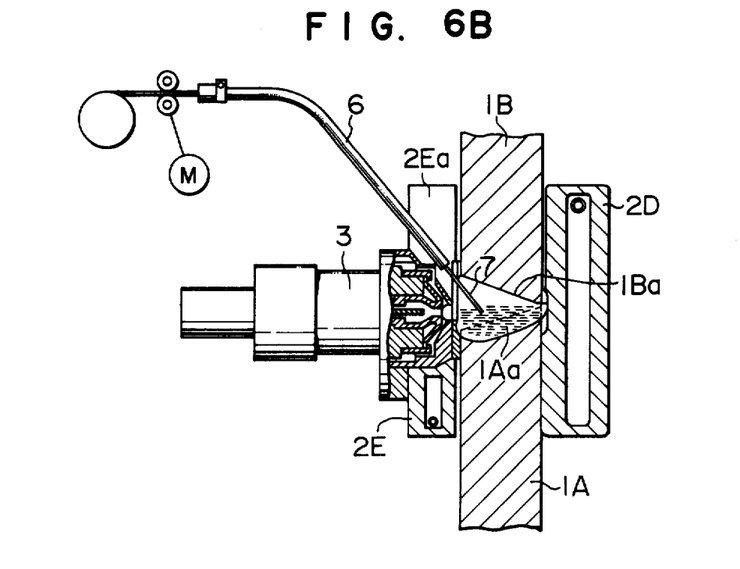
FIG. 6B is also an elevational view (partly as a sectional view) illustrating a modification of the welding apparatus shown in FIG. 6A.

In order to overcome this difficulty, another horizontal position welding apparatus is provided by this invention. In this case, as shown in FIG. 6B, the edges 1Ba and 1Aa of the upper metal plate 1B and the lower metal plate 1A to be butt-welded are tapered to form a "V"-shaped groove therebetween, and particularly the edge 1Ba is tapered so that the welding wire can be freely inserted into the groove from above. In order to facilitate this operation the upper portion of a front holding member 2E is formed with a slot 2Ea just above the non-consumable electrode 3 through which the welding wire is fed into the groove. Thus, the welding wire is always just above the plasma arc, and therefore the molten particles of the welding wire are positively transferred to the molten metal positioned behind the plasma arc, as a result of which a satisfactory bead is produced in the groove.

According to the invention, the power source for generating an arc to melt the consumable electrodes, and the power source for generating a plasma arc to melt the work are controlled independently of each other, which prevents lack of fusion, which is liable to be occur at the start of welding in the electroslag welding. Furthermore, since the plasma arc from the non-consumable electrode torch, that is, a linear heat source, is employed to melt the edges of the plates, the edges of th plates to be welded are uniformly heated, that is, the heating efficiency in the method of this invention is very high. In addition, the torch is provided outside the welding groove, according to the invention, and therefore the width of the welding groove can be made narrow. Due to these features the quantity of heat applied to the work can be minimized, thereby preventing deterioration of the mechanical properties of the portion of the work which has been subjected to heat.

Since no arc is generated between the consumable electrode and the work in melting the former, according to the invention, satisfactory fusion is obtained even if the points of the welding space at which the consumable electrodes should aim, are somewhat changed. Furthermore, the use of the elliptical non-consumable electrode torch having the electrode the elliptical nozzle opening, causes the welding current to disperse in the direction of the major axis of an ellipse representative of the section of the relatively flat arc generated by the torch, and therefore the effective input current is increased, and the energy concentration of the arc column is substantially increased, thereby also increasing the welding rate.

Thus, the narrow-groove welding method of this invention can achieve the vertical position or horizontal position butt welding with a high quality at high efficiency, and narrow-groove welding with a large current, which has not been achieved hitherto by the conventional MIG(metal inert gas) welding method or the like.

The non-consumable electrode torch described above may be replaced by a torch whose arc flame can be used as a linear or columnar heat source, such as, for instance, an ordinary plasma torch having a circular nozzle and an electrode circular in cross-section, a torch which generates a plasma arc elliptical in cross-section by converging the arc with the aid of the gas by a modified nozzle or by the action of a magnetic force, and a TIG (tungsten inert gas) welding torch. Furthermore, the number of the consumable electrode may be more than two, and in this case also an electrical power source or sources are connected between these consumable electrodes.

The non-consumable electrode torch, or the plasma arc generating torch will now be described in detail.

One example of the plasma arc torch, according to another aspect of the invention, as shown in FIGS. 10 to 13, includes an electrode 101 supported by an electrode holder 102, the end portion of the electrode 101 being substantially elliptical in section. A restraining nozzle 103 having an opening 103a is arranged to surround the end portion of the electrode 101, thereby providing a predetermined space therebetween, and the restraining nozzle 103 thus arranged is surrounded by a shielding nozzle 104 having an opening 104a with a predetermined space therebetween. The electrode 101, the restraining nozzle 103, and the shielding nozzle 104 are electrically insulted from one another.

In correspondence with the elliptical section of the end portion of the electrode 101, the configurations of the opening 103a of the restraining nozzle 103, and the opening 104a of the shielding nozzle 104 are substantially elliptical. All of the electrode 101, the restraining nozzle 103 and the shielding nozzle 104 are so arranged that the centers of the ellipses thereof are on one line, and the longitudinal axes, or the major axes thereof are aligned with one another.

Figures 10, 11, 12, 13:
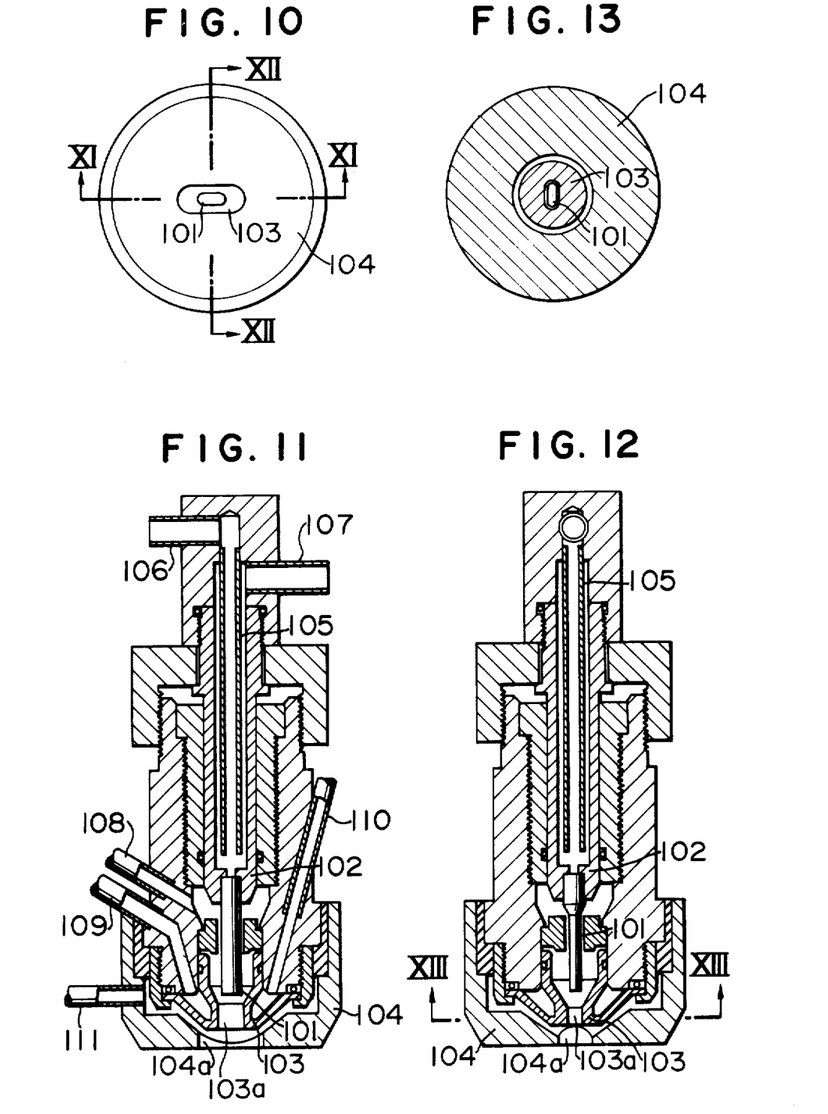
FIG. 10 is a front view showing the nozzle section of a plasma arc generating torch, according to this invention.
FIG. 11 is a longitudinal sectional view, taken along line XI—XI in FIG. 10, as viewed in the arrow direction, illustrating the plasma arc generating torch mentioned above.
FIG. 12 is also a longitudinal sectional view, taken along line XII—XII in FIG. 10, as viewed in the arrow direction, illustrating the plasma arc generating torch.
FIG. 13 is a horizontal sectional view taken along line XIII—XIII in FIG. 12, as viewed in the direction of the arrow.

An electrode cooling pipe 105 is inserted into the electrode holder 102, thereby providing a cylindrical space therebetween. Cooling water introduced through a water inlet 106 passes through the pipe 105 to the electrode 101 to cool the latter, and then flows out of the torch through the cylindrical space formed by the electrode holder 102 and the tube 105, and through a water outlet 107.

A plasma gas is delivered through a plasma gas suction port 108 to the base portion of the electrode 101. The plasma gas thus delivered, surrounding the electrode 101, is blown out toward the end portion of the electrode 101 from the base portion thereof. Cooling water is supplied through a water inlet 109 to the restraining nozzle 103 to cool the latter, and is discharged through a water outlet 110. Shielding gas introduced through a shielding gas suction port 111 is blown toward the tip end of the restraining nozzle 103 and the opening 104a of the shielding nozzle 104 through the space defined by the restraining nozzle 103 and the shielding nozzle 104.

When the torch thus constructed is used, a high frequency voltage is applied between the electrode 101 and the restraining nozzle 103 to generate a pilot arc therebetween, and then the root of the pilot arc thus generated on the restraining nozzle 103 is transferred to the work (not shown) for carrying out a desired welding or cutting operation. The electric power source for the welding or cutting operation is connected between the electrode 101 and the work.

Other examples of the electrode in the non-consumable electrode torch, according to this invention, are shown in FIGS. 14 through 17.

Figure 14:
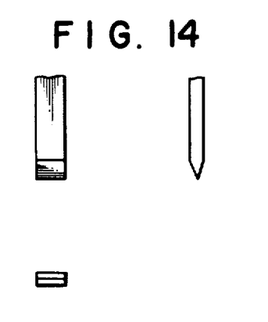
FIGS. 14 through 17 shows various modifications of the electrode in the plasma arc generating torch according to this invention.
Figure 15:
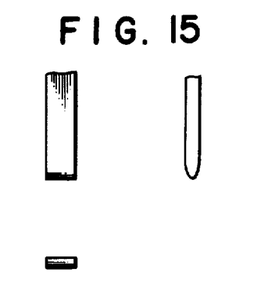
Figure 16:
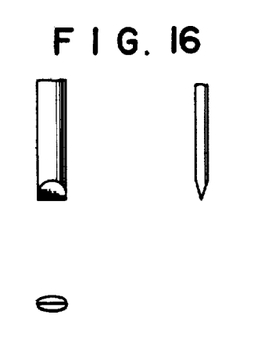
Figure 17:
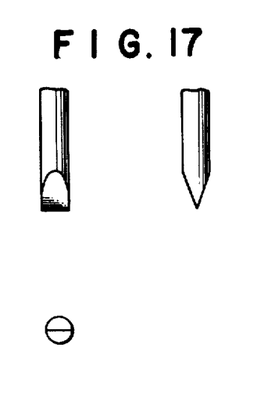

A first example of the electrode, as shown in FIG. 14, is so formed that the section of its base portion is rectangular and its end portion is tapered, or the electrode is obtained by tapering the end portion of a prism having a rectangular section. A second example of the electrode shown in FIG. 15 is similar to that shown in FIG. 15, except that the tapered surfaces of the end portion is curved. A third electrode, according to the invention, as shown in FIG. 16, is so formed that the section of its base portion is elliptical, and similarly as in the first electrode, its end portion is tapered off towards the end. A fourth example of the electrode, as shown in FIG. 17, is similar to the electrodes shown in FIGS. 14 and 16, except that the cross-section of its base portion is circular. These four electrodes may be suitably employed in lieu of the electrode 101 shown in FIGS. 10 through 13, depending on the requirement of the welding operation.

The sectional configuration of an arc generated by an electrode in a plasma arc generating torch is determined by the shape of the end surface of the electrode, and therefore all of the electrodes described above are suitable for generating a flat plasma arc. Thus, by aligning the longitudinal axis of the cross-section of any of the electrodes shown in FIGS. 14 through 17 with that of the opening of the restraining nozzle, which opening has a relatively elongated sectional configuration, such as a rectangular or elliptical configuration, a desired flat plasma arc can be obtained.

With the plasma arc generating torch, according to this invention, as was described above, an arc generated from the electrode having its end portion tapered off to one end is flat in section, and this flat condition of the arc is maintained by the restraining nozzle until the arc is applied to the work. Accordingly, in the torch of this invention, unlike the conventional plasma arc generating torch which forcibly forms a flat plasma arc by a plasma gas or Lorentz' force utilizing a magnetic control, the flow rate of the gas is smaller, and the restraining nozzle can be protected from damage.

Furthermore, according to the invention, the above-described flat plasma arc can be generated without the provision of a magnetic generator or means for regulating the direction of a gas flow; that is, the torch provided by the invention has a simpler construction. As the end portion of the electrode in the torch is shaped as described above, according to the invention, it is possible to increase the welding current or the cutting current of the torch approximately twice as much as that of a conventional torch, and therefore the welding or cutting operation with a relatively large capacity can be positively carried out with a relatively small single electrode.

If, in the case where the flat plasma arc is employed for seam welds, the longer diameter of the section of the arc is aligned with the weld line, a weld in which weld penetration into the work is deep, and the width of the bead is narrow can be obtained, and furthermore the arc can be employed as a linear heat source in the plasma cutting operation and can also be employed in the vertical position narrow groove welding process conducted by using the plasma arc generating torch. In addition, if the shorter diameter of the section of the arc is aligned with the weld line, a satisfactory padding weld can be obtained.

One aspect of the invention has been described in connection with the plasma arc generating torch of the arc transfer type; however, it should be noted that the technical concept of this aspect of the invention can be applied to plasma arc generating torches of the arc non-transfer type.

What is claimed is:

1. A narrow groove welding apparatus for butt-welding metal plates, the plates having edges, front and rear surfaces and being formed with a relatively narrow welding groove defined by the edges of the metal plates for forming a welding space, comprising:
- a. front and rear holding member adapted to slidably hold the front and rear surfaces of the metal plates;
- b. a non-consumable electrode torch fixedly provided on said front holding member for generating a plasma arc to melt the edges of the mtal plates;
- c. an electrically insulating plate provided on said front holding member for the latter to be in contact with the front surface of the metal plates through said electrically insulating plate for electrically insulating said non-consumable electrode torch and said front holding member from the metal plates to be welded;
- d. a plurality of consumable electrodes which are fed into said welding space in a direction opposite to a welding direction;
- e. a first electric power source connected between said non-consumable electrode torch and the metal plates for generating an arc to melt the edges of the metal plates in the welding space;
- f. a second electric power source connected between at least two of said plurality of consumable electrodes for generating arcs therebetween to melt the latter; and
- g. means for moving said front and rear holding member, said non-consumable electrode torch, and said plurality of consumable electrodes along the welding groove.

2. A welding apparatus as claimed in claim 1 in which the groove is formed with front and rear sides, at least two of said plurality of consumable electrodes being provided on the front side of the groove, the remaining electrodes being provided on the rear side of the welding groove.

3. A welding apparatus as claimed in claim 1 in which said electrical insulating plate is formed with a first bead forming groove provided in correspondence with the welding groove, two embossed side portions being obtained by the formation of said first bead forming groove, said first bead forming groove having a portion defining a through-hole for introducing an arc from said non-consumable electrode torch into the welding space.

4. A welding apparatus as claimed in claim 3, in which one of said two side portions of said electrically insulating plate is thinner than the other of said side portions, and said rear holding member has a portion defining a second bead forming groove provided in correspondence with the welding groove formed by the edges of the metal plates, two embossed side portions being obtained by the provision of said second bead forming groove, one of said two side portions being thinner than the other of said side portions, said first and second bead forming grooves being placed horizontally so that the thinner side portions of said electrically insulating plate and of said rear holding member form gaps between said front holding member and said metal plates, and between said rear holding member and said metal plates, respectively, so as to discharge gas into the welding space upwardly, thereby achieving a horizontal position butt-welding.

5. A welding apparatus as claimed in claim 4 in which said front holding member has an upper portion formed with a slot so as to introduce said consumable electrodes into the;welding space from above.

6. A welding apparatus as claimed in claim 1 in which said non-consumable electrode torch is a plasma arc generating torch.

7. A welding apparatus as claimed in claim 6 in which said plasma arc generating torch comprises:
- a. an electrode having an outer end portion of a relatively elongated configuration in cross-section;
- b. a restraining nozzle surrounding said end portion of said electrode, said restraining nozzle having a nozzle opening of a relatively elongated configuration in correspondence with the elongated configuration of said electrode, said electrode and said restraining nozzle being arranged for the longitudinal axes of the elongated configuration of said electrode and of said restraining nozzle to be aligned with each other so as to effectively utilize the energy of a plasma arc generated by said plasma arc generating torch.

8. A welding apparatus as claimed in claim 7, in which said end portion of said electrode is tapered towards one end thereof.

9. A welding apparatus as claimed in claim 8, in which said elongated configurations of said electrode and said nozzle opening are rectangular.

10. A welding apparatus as claimed in claim 8, in which said elongated configurations of said electrode and said nozzle opening are elliptical.

* * * * *